(12) United States Patent
Gutierrez et al.

(10) Patent No.: US 6,584,845 B1
(45) Date of Patent: Jul. 1, 2003

(54) INERTIAL SENSOR AND METHOD OF USE

(75) Inventors: Roman C. Gutierrez, La Crescenta, CA (US); Tony K. Tang, Glendale, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/502,403

(22) Filed: Feb. 10, 2000

Related U.S. Application Data

(60) Provisional application No. 60/119,479, filed on Feb. 10, 1999.

(51) Int. Cl.[7] ................................................. G01P 15/08
(52) U.S. Cl. .................................. 73/514.15; 73/504.04
(58) Field of Search .......................... 73/514.15, 514.29, 73/504.04, 504.12, 510

(56) References Cited

U.S. PATENT DOCUMENTS

| | | | | |
|---|---|---|---|---|
| 4,699,006 A | * | 10/1987 | Boxenhorn | 73/514.15 |
| 5,712,427 A | * | 1/1998 | Matthews | 73/504.04 |
| 5,894,090 A | | 4/1999 | Tang et al. | 73/504.02 |
| 6,079,272 A | | 6/2000 | Stell et al. | 73/504.12 |
| 6,085,594 A | | 7/2000 | Gutierrez et al. | 73/704 |
| 6,219,145 B1 | | 4/2001 | Gutierrez et al. | 356/498 |

OTHER PUBLICATIONS

Juneau, T., "Micromachined Dual Input Axis Angular Rate Sensor", 3 pp. (undated).

* cited by examiner

Primary Examiner—John E. Chapman
(74) Attorney, Agent, or Firm—Christie, Parker & Hale, LLP

(57) ABSTRACT

The inertial sensor of the present invention utilizes a proof mass suspended from spring structures forming a nearly degenerate resonant structure into which a perturbation is introduced, causing a split in frequency of the two modes so that the mode shape become uniquely defined, and to the first order, remains orthogonal. The resonator is provided with a mass or inertia tensor with off-diagonal elements. These off-diagonal elements are large enough to change the mode shape of the two nearly degenerate modes from the original coordinate frame. The spring tensor is then provided with a compensating off-diagonal element, such that the mode shape is again defined in the original coordinate frame. The compensating off-diagonal element in the spring tensor is provided by a biasing voltage that softens certain elements in the spring tensor. Acceleration disturbs the compensation and the mode shape again changes from the original coordinate frame. By measuring the change in the mode shape, the acceleration is measured.

22 Claims, 9 Drawing Sheets

INERTIAL SENSOR AND METHOD OF USE

This application claims the benefit of U.S. Provisional Application No. 60/119,479, filed Feb. 10, 1999, which is incorporated by reference in its entirety into the present disclosure.

STATEMENT AS TO FEDERALLY SPONSORED RESEARCH

The invention described herein was made in the performance of work under a NASA contract, and is subject to the provisions of Public Law 96-517 (35 U.S.C. 202) in which the Contractor has elected to retain title.

BACKGROUND OF THE INVENTION

Future space exploration missions require high performance inertial measurement systems for navigation, guidance, and attitude control. Micromachined vibratory gyroscopes are promising candidates to replace conventional gyroscopes for future miniature spacecraft control and avionics applications while simultaneously satisfying stringent physical requirements of low mass, volume, power and cost. U.S. Pat. No. 5,894,090 to Tang et al., assigned to the same assignees as the present invention, describes such a micromachined vibratory gyroscope and is incorporated by reference in its entirety into the present disclosure. The techniques described in Tang et al. can also be used in the fabrication of the present invention. At times accelerometers are required to be part of these inertial measurement systems. There is therefore a need for a micromachined inertial sensor combining rotation and acceleration measurement functions to greatly reduce the complexity, mass, volume and power of such inertial measurement systems. It is also desirable for such an inertial sensor to be economical yet accurate and reliable.

SUMMARY OF THE INVENTION

The inertial sensor and method of use of the present invention provides an accurate and reliable, yet compact, light-weight, and relatively simple accelerometer and gyroscope combination, or alternatively provides a stand-alone accelerometer.

A resonator structure with two perfectly degenerate, or same frequency, modes can be made to move in an arbitrary motion that is a linear combination of the two modes. Furthermore, the mode shapes of the two modes are orthogonal, but otherwise arbitrarily defined. The inertial sensor of the present invention utilizes a proof mass suspended from spring structures forming a nearly degenerate resonant structure into which a perturbation is introduced, causing a split in frequency of the two modes so that the mode shape becomes uniquely defined, and to the first order, remains orthogonal. The resonator is provided with a mass or inertia tensor with off-diagonal elements. These off-diagonal elements are large enough to change the mode shape of the two nearly degenerate modes from the original coordinate frame. The spring tensor is then provided with a compensating off-diagonal element, such that the mode shape is again defined in the original coordinate frame. The compensating off-diagonal element in the spring tensor is provided by a biasing voltage that softens certain elements in the spring tensor. Acceleration disturbs the compensation and the mode shape again changes from the original coordinate frame. By measuring the change in the mode shape, the acceleration is measured.

One embodiment of the inertial sensor of the present invention measures acceleration or acceleration and rotation by using a proof mass having a defined center and a mass imbalance such that the center of mass of the structure is spaced from the defined center; the proof mass is suspended from a frame by spring structures; drive circuitry rocks the proof mass about a rocking axis passing through the defined center; bias circuitry supplies a voltage to compensate for the mass imbalance; sensing circuitry measures acceleration by detecting the change of a mode shape of the proof mass; and output circuitry generates a signal indicating the acceleration.

In one embodiment the method of the present invention is performed by rocking a proof mass about a first rocking axis passing through a defined center; supplying a bias voltage to compensate for a mass imbalance of the proof mass; measuring acceleration by detecting change of a mode shape of the proof mass; and outputting a signal indicating the acceleration.

BRIEF DESCRIPTION OF THE DRAWINGS

In the drawings, which constitute part of this specification, embodiments demonstrating various features of the invention are set forth as follows.

DETAILED DESCRIPTION OF THE PREFERRED EMBODIMENTS

Although detailed illustrative embodiments are disclosed herein, other suitable structures and machines for practicing the invention may be employed and will be apparent to persons of ordinary skill in the art. Consequently, specific structural and functional details disclosed herein are representative only; they merely describe exemplary embodiments of the invention.

Figure 1:
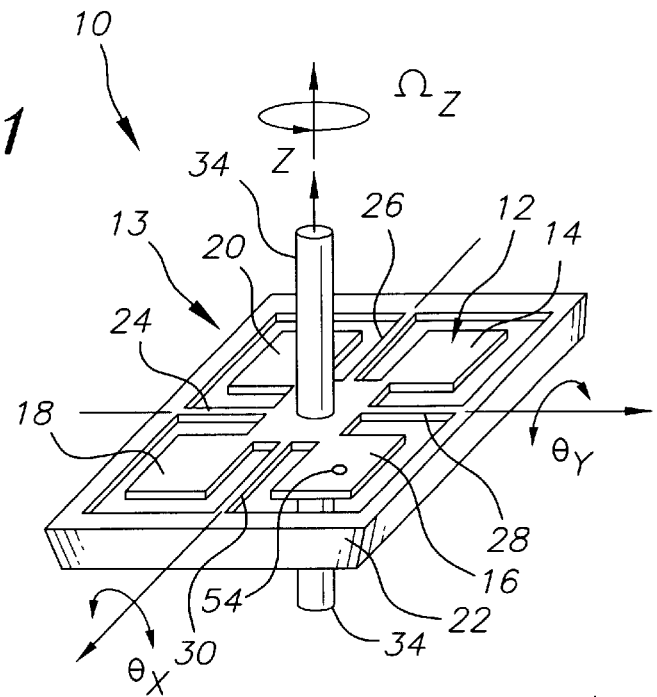
FIG. 1 is a perspective view of the proof mass, spring structures, rim and post of the inertial sensor of the present invention.
Figure 2:
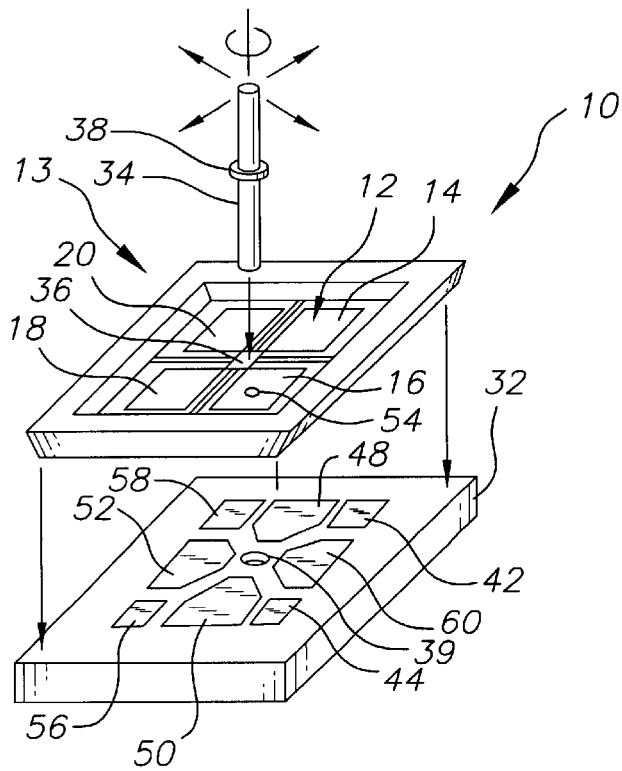
FIG. 2 is an exploded perspective view of the inertial sensor of FIG. 1, also showing a base plate.

FIG. 1 shows a simplified perspective view and FIG. 2 shows a simplified exploded perspective view of a portion of one embodiment of an inertial sensor according to the present invention. The inertial sensor 10 has an inertial sensing structure or proof mass 12 suspended from a rim 22 by four spring structures 24, 26, 28, 30. The combined proof mass 12 and four spring structures 24, 26, 28, 30 form a resonator structure 13. In one embodiment, the proof mass 12 is a substantially planar, two fold symmetric cloverleaf structure having four square leaves 14, 16, 18, 20. Other resonating structures, symmetrical or non-symmetrical can be substituted for the four leaf clover structure 12. Also, the proof mass, spring structures and frame can all be made of a monolithic micromachined body of silicon or other suitable semi-conductor material.

The spring structures 26, 30 lie along a spring or drive axis x, while the spring structures 24, 28 lie along a spring or sense axis y. The rim 22 is attached to a base plate 32. The base plate 32 can be quartz or any other suitable material. A post 34 is rigidly attached through a defined center or a geometrical center 36 of the proof mass 12 such that the center of mass 38 of the post 34 is aligned with the cloverleaf geometrical center 36. At the geometrical center 36 can be an opening through which the post 34 is received. The post 34 also passes through an opening at a center 39 of the base plate 32 between electrodes 42, 44, 48, 50, 52, 56, 58, 60 patterned on the base plate 32. The electrodes 42, 44 are drive electrodes which receive an AC voltage from an electrical circuit 46 (FIG. 6), thereby exerting a force on the corresponding leaves 14, 16 to drive the proof mass 12 to oscillate. Sensing electrodes 48, 50, 52 are also connected to the electrical circuit 46 to capacitively detect the motions of the proof mass 12.

Figure 3:
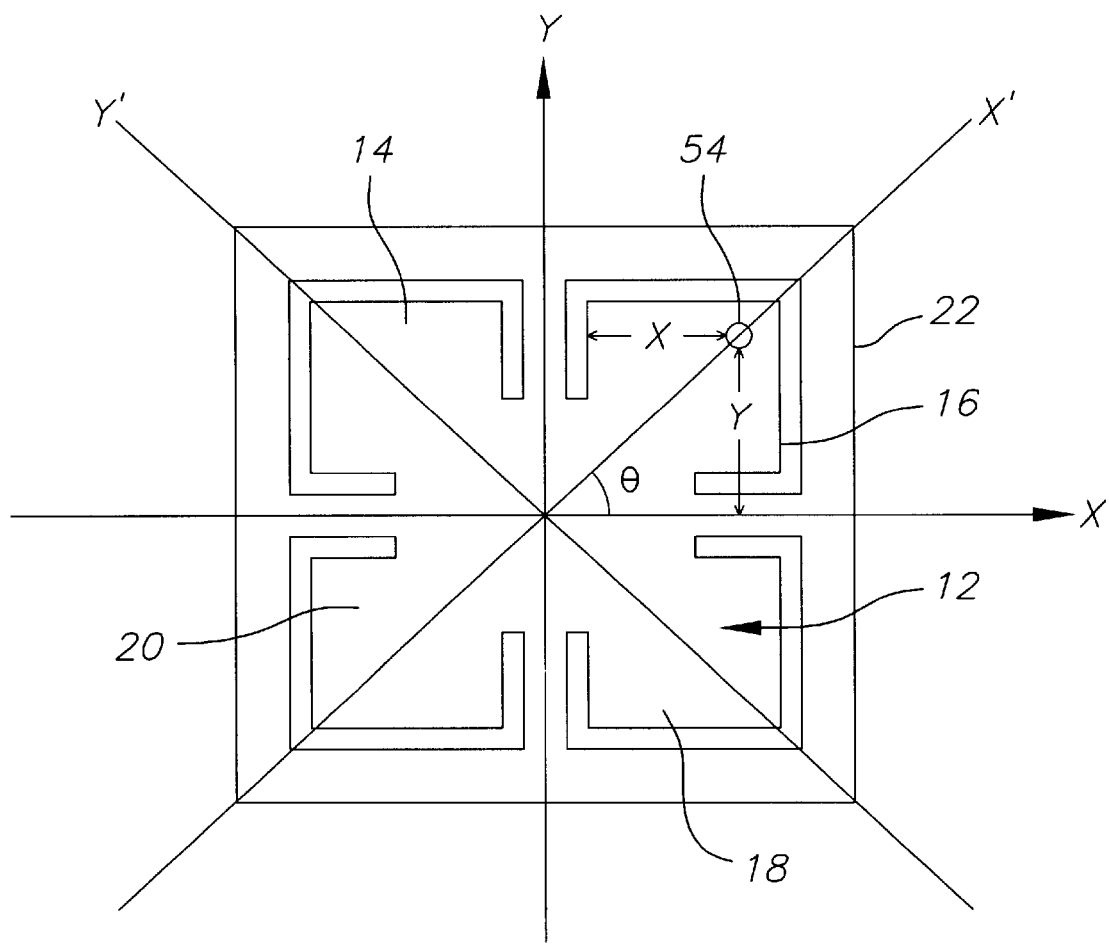
FIG. 3 is a diagrammatic view of the proof mass, spring structures and rim of the inertial sensor of FIG. 1.

The proof mass 12 has a small mass imbalance 54 which moves the center of mass of the proof mass 12 away from the geometrical center 36. The mass imbalance 54 can be created by adding or removing material from one or more of the four silicon leaves 14, 16, 18, 20. The mass imbalance 52 can also be created by asymmetries occurring during fabrication. In a system with a perfectly balanced proof mass suspended from four spring structures 24, 26, 28, 30 having degenerate spring constants, the proof mass will rock about the drive and sense axes x, y aligned with the four spring structures as illustrated in FIG. 3. However, due to the mass asymmetry, the drive electrodes 42, 44 cause the resonator structure 13 to have a mode shape rocking about nodes aligned with rocking axes x' and y', also illustrated in FIG. 3. The nodes are the lines about which the proof mass 12 rocks. The electrical circuit 46 compensates electrostatically for the mass imbalance by applying different electrostatic biases to the electrodes 58, 60 to rotate the rocking axes x' and y', and thus the mode shape, into a position of alignment with the drive axis x, aligned with the length of the spring structures 26, 30, and the sense axis y, aligned with the length of the spring structures 24, 28.

Applicants have found that subjecting the electrostatically compensated inertial sensor 10 to a z-axis directed component of acceleration also changes the mode shape of the resonator structure 13. Measuring this change in mode shape provides an accurate measurement of acceleration. Examining the resonator structure 13 mathematically provides valuable insight into the reasons why electrostatic compensation and acceleration effect the mode shape and into ways to optimize the inertial sensor 10 to measure acceleration.

In Lagrangian mechanics the equations of motion are written as $$\frac{\partial}{\partial t}\frac{\partial L}{\partial \dot{\theta}_i} - \frac{\partial L}{\partial \theta_i} = 0, \qquad [1]$$

where L is the Lagrangian in coordinates $(\theta_i, \dot{\theta}_i)$, $\theta_i$ is the rocking angle of a structure about an i-axis, and $\dot{\theta}_i$ is the time derivative of $\theta_i$, representing the angular rocking rate about the j-axis.

The Lagrangian, L, is defined as:

$$L = T - U, \qquad [3]$$

where T is the structure's kinetic energy and U is the structure's potential energy. For the proof mass suspended from the spring structures:

$$U = \frac{1}{2} K_{ij} \theta_i \theta_j \qquad [4]$$

and $$T = \frac{1}{2} I_{ij} \dot{\theta}_i \dot{\theta}_j, \qquad [5]$$

where $K_{ij}$ is the spring tensor of the spring structures, $I_{ij}$ is the inertial tensor of the inertial sensing structure, $\theta_j$ is the rocking angle of the inertial sensing structure relative to a j-axis perpendicular to the i-axis about which the structure rocks, and $\dot{\theta}_j$ is the time derivative of $\theta_j$, representing the angular rocking rate about the j-axis. Substituting EQUATIONS [3]-[5] into EQUATION [1], the equations of motion become:

$$\frac{1}{2} I_{ij} \ddot{\theta}_j + \frac{1}{2} K_{ij} \theta_j = 0. \qquad [6]$$

The equations of motion in matrix form are then $$\begin{pmatrix} I_{11} & I_{12} \\ I_{21} & I_{22} \end{pmatrix} \begin{pmatrix} \ddot{\theta}_1 \\ \ddot{\theta}_2 \end{pmatrix} + \begin{pmatrix} K_{11} & K_{12} \\ K_{21} & K_{22} \end{pmatrix} \begin{pmatrix} \theta_1 \\ \theta_2 \end{pmatrix} = \begin{pmatrix} 0 \\ 0 \end{pmatrix}. \qquad [7]$$

For the inertial sensor 10 of FIGS. 1 and 2, the equations of motion describing the proof mass 12 and spring structures 24, 26, 28, 30 of the resonator structure 13 can be written as $$\begin{pmatrix} I_{xx} + y^2 m & -xym \\ -xym & I_{yy} + x^2 m \end{pmatrix} \begin{pmatrix} \ddot{\theta}_x \\ \ddot{\theta}_y \end{pmatrix} + \qquad [8]$$

$$\begin{pmatrix} K_{xx} - \gamma_1 - \gamma_2 & -\gamma_1 \\ -\gamma_1 & K_{yy} - \gamma_1 \end{pmatrix} \begin{pmatrix} \theta_x \\ \theta_y \end{pmatrix} = \begin{pmatrix} 0 \\ 0 \end{pmatrix}.$$

The inertial tensor has been modified by terms accounting for the mass imbalance 54 having a magnitude of m and located at position (x, y) as illustrated in FIG. 3. $\theta_x$ is the rocking angle of the proof mass 12 relative to the x-axis and $\theta_y$ is the rocking angle of the proof mass 12 relative to the y-axis as shown in FIG. 1. The terms $\dot{\theta}_x$ and $\dot{\theta}_y$ are the time derivatives of $\theta_x$ and $\theta_y$, respectively, representing the angular rocking rates. The spring tensor is modified by the electrostatic spring softening terms $\gamma_1$ and $\gamma_2$ to compensate for the mass imbalance 54.

Figure 4:
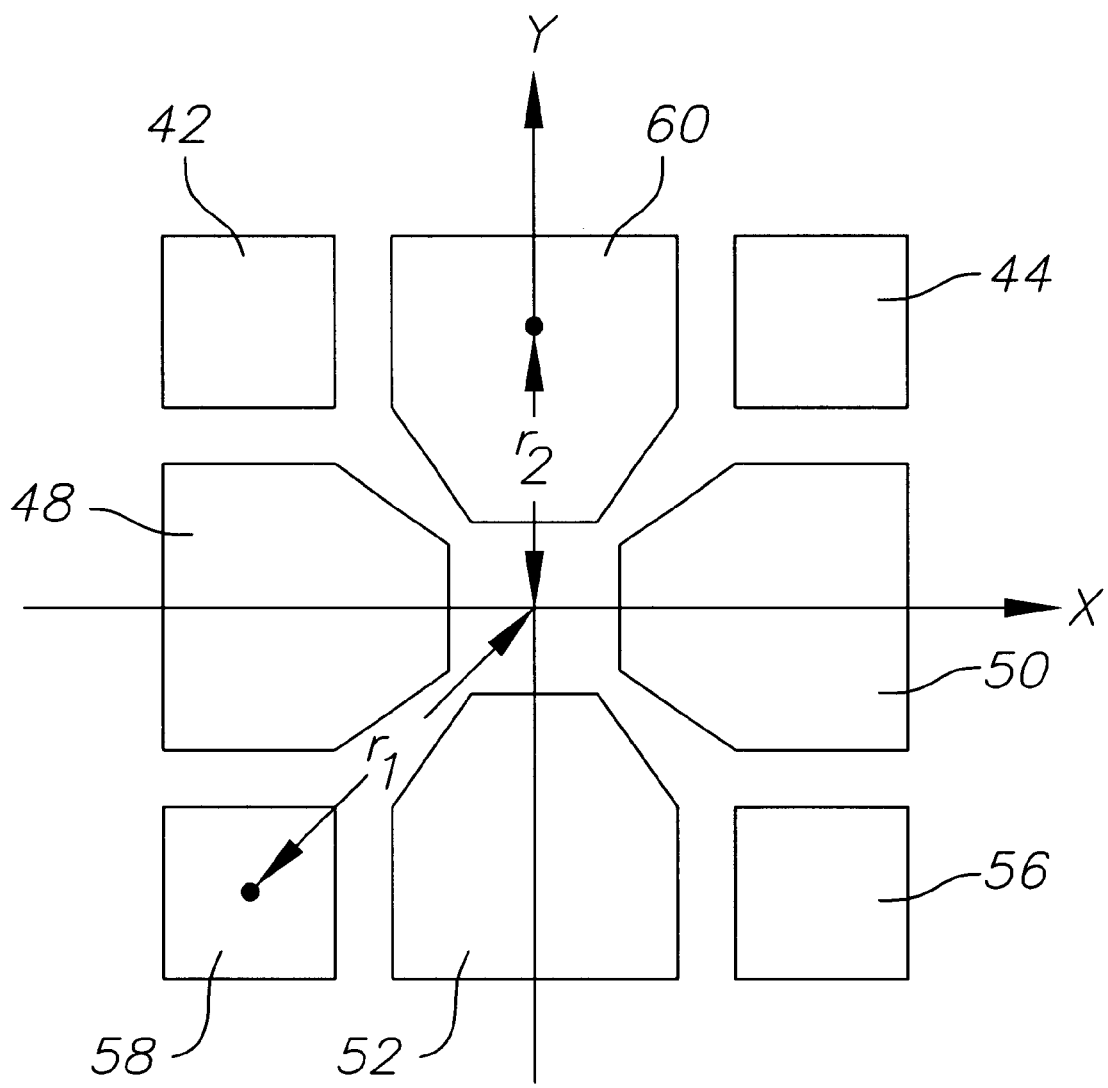
FIG. 4 is a diagrammatic view of the eight electrode structure of the inertial sensor of FIG. 1.
Figure 5:
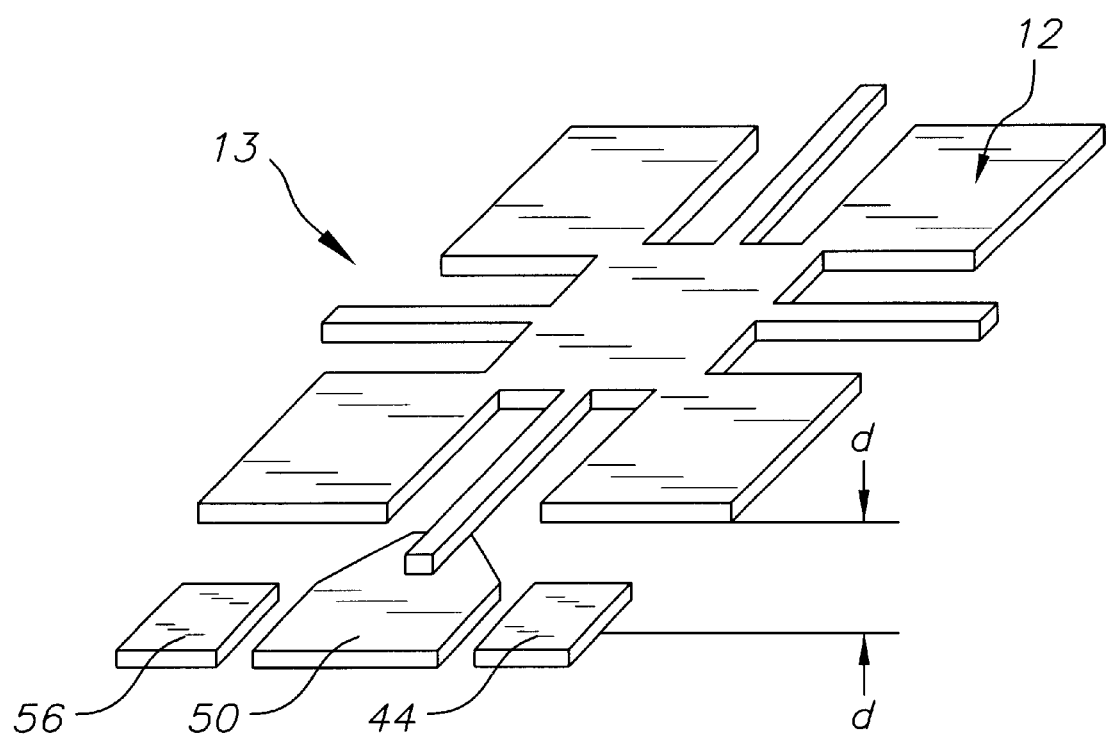
FIG. 5 is a diagrammatic view of the proof mass positioned adjacent to the electrode structure.

The term $\gamma_1$ represents the spring softening provided by the diagonal biasing electrode 58 and the term $\gamma_2$ represents the electrostatic spring softening provided by the spring-axis biasing electrode 60. FIG. 4 illustrates the electrodes 42, 44, 48, 50, 52, 56 and FIG. 5 illustrates the proof mass 12 positioned adjacent to the electrodes 42, 44, 48, 50, 52, 56, 58, 60. The terms $\gamma_1$ and $\gamma_2$ can be written as:

$$\gamma_1 = \frac{r_1^2 C_a V_1^2}{2d^3} \qquad [9]$$

and

-continued $$\gamma_2 = \frac{r_2^2 C_a V_2^2}{d^3} \quad [10]$$

where $r_1$ and $r_2$ are the distances from the center 39 of the base plate 32 to the diagonal biasing electrode 58 and the spring-axis biasing electrode 60, respectively. The terms $V_1$ and $V_2$ represent the compensating biasing voltage applied to the diagonal biasing electrode 58 and the spring-axis biasing electrode 60, respectively. The term d represents the average distance between the electrodes and the proof mass 12 as illustrated in FIG. 5 and the term $C_a*d$ represents the average capacitance between the biasing electrodes 58, 60 and the proof mass 12. $C_a$ is equivalent to the product of the permitivity ($\epsilon$) between the leaf structures and the electrodes, and the area of the electrodes (A).

To rotate the resonant modes from the x'-y' coordinate system back to the x-y coordinate system, the cross terms in EQUATION [8] are forced to cancel individually yielding:

$$-xym[\$]\$\ddot{g}\ddot{v}_x - \gamma_1\theta_x = 0 \quad [11]$$

$$-xym[\$]\$\ddot{g}\ddot{v}_y - \gamma_1\theta_y = 0 \quad [12]$$

$$(I_{xx}+y^2m)\theta_x + (K_{xx}-\gamma_1-\gamma_2)\theta_x = 0 \quad [13]$$

$$(I_{yy}+x^2m)\theta_y + (K_{yy}-\gamma_1)\theta_y = 0. \quad [14]$$

Solving for $\gamma_1$ and $\gamma_2$ yields:

$$\gamma_1 = \frac{xymK_{yy}}{xym + I_{yy} + x^2m} \quad [15]$$

$$\gamma_2 = K_{xx} - K_{yy}\left(\frac{I_{xx} + y^2m + xym}{I_{yy} + x^2m + xym}\right). \quad [16]$$

Assuming that $y^2m+xym$ is small compared to $I_{xx}$, $\gamma_1$ and $\gamma_2$ can be rewritten in simpler form as:

$$\gamma_1 = xym\omega_y^2 \quad [17]$$

$$\gamma_2 = I_{xx}(\omega_x^2 - \omega_y^2) \quad [18]$$

where $$\omega_x = \sqrt{\frac{K_{xx}}{I_{xx} + xym + y^2m}} \quad [19]$$

$$\omega_y = \sqrt{\frac{K_{yy}}{I_{yy} + xym + x^2m}}. \quad [20]$$

EQUATION [18] shows how $\gamma_2$ compensates for the frequency split partially caused by the mass imbalance.

Equating EQUATIONS [9] and [10] with EQUATIONS [17] and [18], respectively, yields the compensating biasing voltage V1 to be applied to the biasing electrodes 58 and the biasing voltage V2 to be applied to the biasing electrode 60 in order to compensate for the mass imbalance:

$$V_1 \sqrt{\frac{2\omega_y^2 d^3 mxy}{r_1^2 A_1 \epsilon}} \quad [21]$$

and $$V_2 = \sqrt{\frac{(\omega_x^2 - \omega_y^2)d^3 I_{xx}}{r_2^2 A_2 \epsilon}} \quad [22]$$

where $\epsilon$ represents the permitivity between the leaf structures and the electrodes 58 and the electrode 60, respectively. $A_1$ and $A_2$ represent the area of the electrodes 58 and the electrode 60, respectively.

Acceleration along the z-axis results in a modified distance d between the biasing electrodes 58, 60 and the proof mass 12 as illustrated in FIG. 5. The distance d is modified by acceleration a according to:

$$d' = -\frac{a}{\omega_z^2} + d \quad [23]$$

where the term $\omega_z$ represents the oscillation frequency of the motion of the proof mass 12 along the z-axis. From EQUATION [23] it can be seen that acceleration along the positive z-axis reduces the distance d by a factor of $$\frac{a}{\omega_z^2}.$$

Substituting EQUATION [23] into EQUATIONS [21] and [22] and assuming that $$\frac{a}{\omega_z^2 d} \ll 1$$

results in the approximate change in biasing voltages due to acceleration along the z-axis:

$$\Delta V_1 \approx \frac{a}{\omega_z^2 d} \quad [24]$$

and $$\Delta V_2 \approx \frac{a}{\omega_z^2 d} \quad [25]$$

To optimize the inertial sensor 10 for sensing acceleration, $\Delta V_1$ and $\Delta V_2$ should be large. EQUATIONS [24] and [25] reveal that smaller values of acceleration can be detected by making $\Delta V_1$ and $\Delta V_2$ relatively large. In order to make $\Delta V_1$ and $\Delta V_2$ large, the frequency $\omega_z$ and the distance d should be relatively small.

Figure 6:
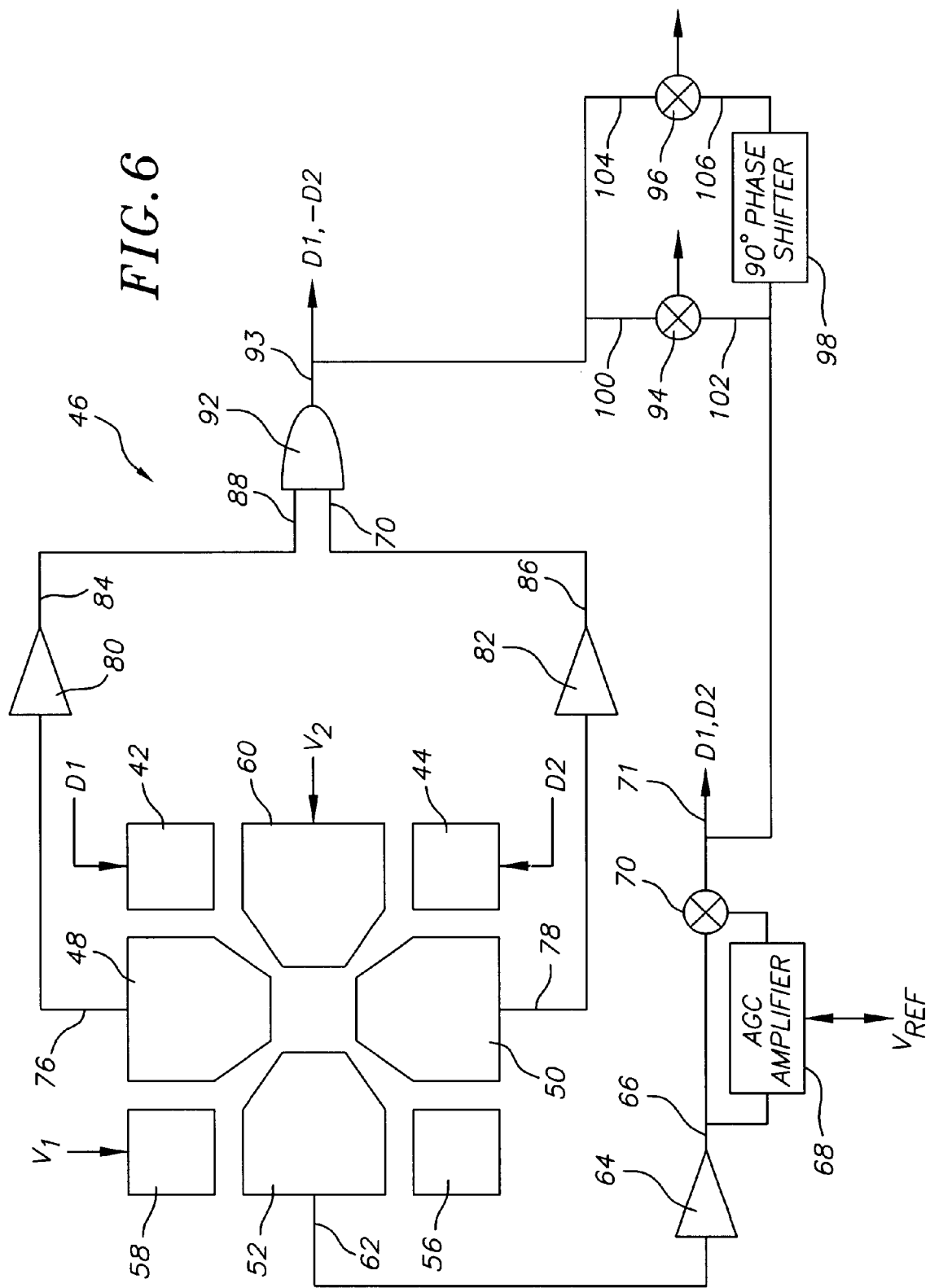
FIG. 6 is a block diagram of the circuitry for driving and sensing signals from the inertial sensor of FIG. 1.

FIG. 6 illustrates a circuit 46 for measuring the change in mode shape in order to measure acceleration. Additionally, this circuit allows for simultaneous and independent measurement of the acceleration applied to the inertial sensor 10 along the z-axis as well as the rotation of the inertial sensor about the z-axis so that the inertial sensor 10 serves as both an accelerometer and gyroscope. First, the proof mass 12 is driven by the drive electrodes 42, 44 to rock about the rocking axes x' and y', as illustrated in FIG. 3. The compensating electrostatic spring-softening biasing voltages $V_1$, $V_2$ of EQUATIONS [21] and [22] are applied to the diagonal biasing electrode 58 and the spring-axis biasing electrode 60, respectively, to compensate for the mass imbalance and rotate the nodes of the mode shape back into alignment with the spring axes x, y. The inertial sensor 10 is subjected to a z-axis directed component of acceleration. As explained above, the z-axis directed component of acceleration rotates the nodes of the mode shape out of alignment with the spring axes x, y. The circuit 46 provides torque or force rebalancing and drive amplitude control to the resonator structure 13 as follows.

An output 62 of the sensing electrode 52 is provided to a preamplifier 64. The output 66 of the preamplifier 64 is connected to an automatic gain control amplifier ("AGC amplifier") 68. The output 66 of the preamplifier is also provided to a voltage controlled amplifier 70 which is controlled by the voltage output of the AGC amplifier 68. The AGC amplifier also receives a reference voltage $V_{REF}$ as input. The mixer 70 outputs a drive signal 71 which is split into two signals. The drive signals are fed back to drive electrodes 42, 44 respectively. The drive signals are in phase and thus provide torque about the drive or spring axis x and provide drive amplitude control.

The outputs 76, 78 of the spring axis sensing electrodes 48, 50 are provided to preamplifiers 80, 82, respectively. The outputs 84, 86 of the preamplifiers 80, 82 are then fed to the inputs 88, 90 of a differential amplifier 92. The differential amplifier 92 outputs a sense signal 93 which is split into two signals. One of the signals is fed back in phase to the drive electrode 42 and the other signal is fed into an inverter prior to being fed back to the electrode 44. The sense signals fed to the drive electrodes 42, 44 are thus out of phase in order provide force or torque rebalancing about the sense or spring axis y.

The force or torque rebalancing substantially eliminates rocking motion of the proof mass about the spring or sense axis y caused by the rotation mass imbalance or acceleration. Also, the applicants have found that the output acceleration and rotation signals are in quadrature, or at 90°, with each other. This allows the present invention to use the same method as in U.S. Pat. No. 5,894,090 to Tang, cited above, to measure the rotation about z-axis, while simultaneously using the present method to measure acceleration.

It can be shown that the acceleration signal is in quadrature with both the rotation signal and the drive signal as follows:

$$T_D = \tau_D \cos \omega t \quad [32]$$

$$T_S = \tau_D \cos \theta \sin \theta \cos \omega t - \tau_D \sin \theta \cos \theta \cos(\omega t + \phi) \quad [33]$$

where $T_D$ drive torque functions and $T_s$ is the sense torque function representing the torque required to prevent rocking about the sense axis caused by the drive torque $T_D$, $\tau_D$ is the torque amplitude about the drive axis x, t is time, ω is the rocking frequency about the drive axis x and θ is the angle between the drive axis x and the rotated axis x' as illustrated in FIG. 3. The sense torque function $T_s$ is in phase with the acceleration signal. Making several simplifying assumptions results in:

$$T_S \approx \tau_D \theta \phi \sin \omega t \quad [34]$$

From EQUATIONS [32] and [34] it can be seen that $T_D$ and $T_s$ are in quadrature to each other and thus the acceleration signal is in quadrature with both the rotation signal and the drive signal.

The output 71 from the voltage controlled amplifier 70 and the output 93 from the differential amplifier 92 are applied to inputs 102, 100 of the demodulator 94 where they are demodulated in phase to produce an output signal indicating the amount of rotation experienced by the inertial sensor 10.

The output 71 from the voltage controlled amplifier 70 is provided to a 90° phase shifter 98 so that it can be demodulated by the demodulator 96 in quadrature with the output 93 of the differential amplifier 92. The demodulator 96 then outputs a signal indicating the amount of acceleration experienced by the inertial sensor 10.

Figure 7:
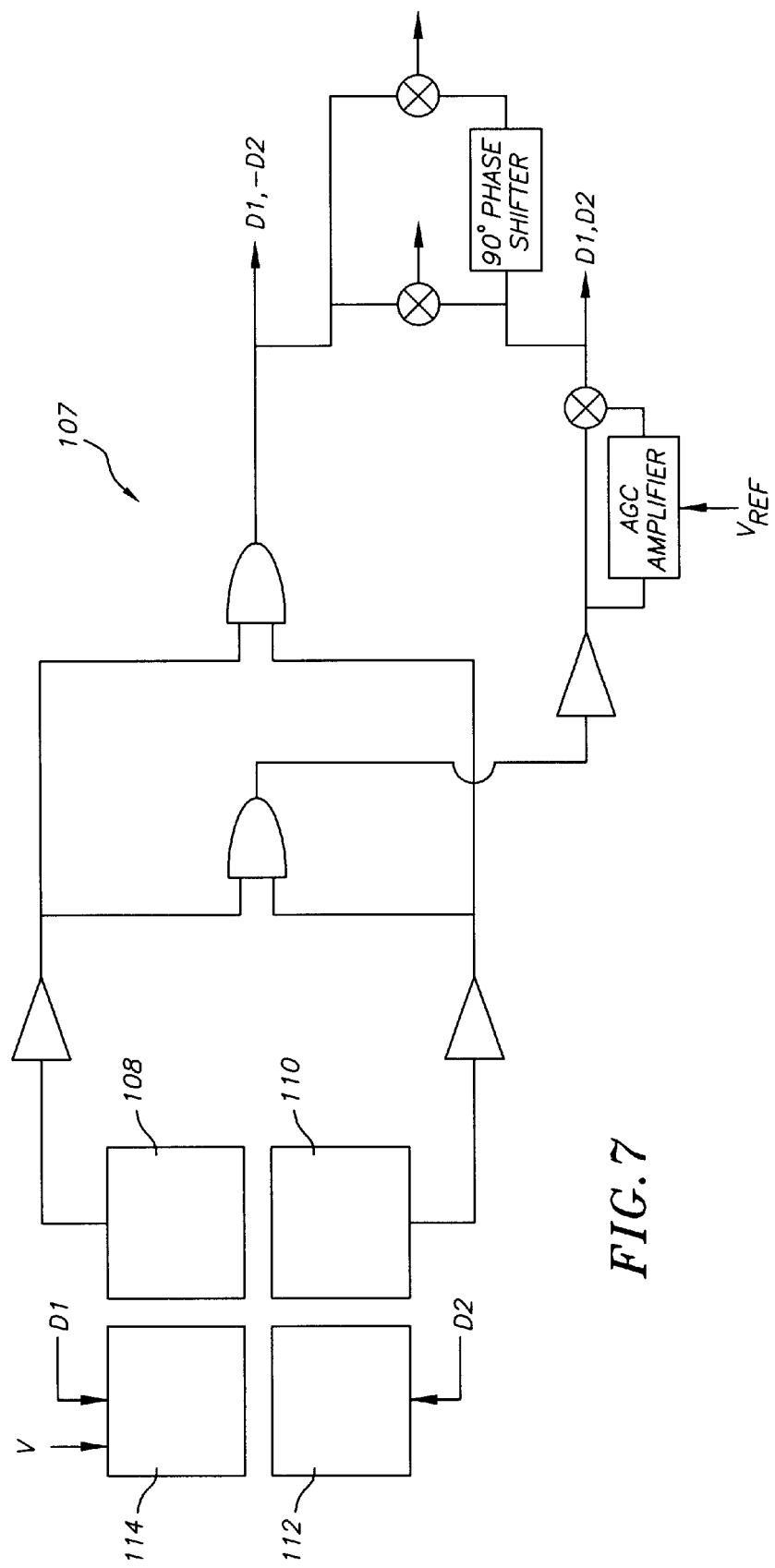
FIG. 7 is a block diagram of the circuitry for driving and sensing signals from a four electrode version of the inertial sensor of FIG. 1.

A four electrode embodiment of a circuit 107 for measuring rotation and acceleration is illustrated in FIG. 7. The circuit 107 functions similarly to circuit 46 of FIG. 6, but does not have the spring axis bias electrode. With only a single bias electrode 114, the circuit 107 is unable to completely compensate for the mass imbalance caused mode rotation.

Figure 8:
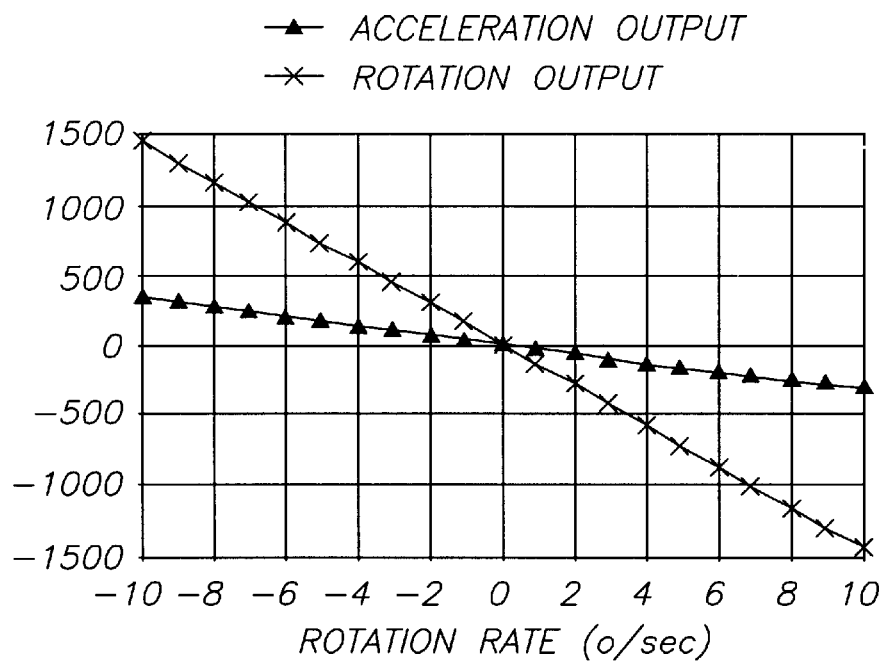
FIG. 8 is a graph of rotation test results showing the response of rotation output and acceleration output to rotation.
Figure 9:
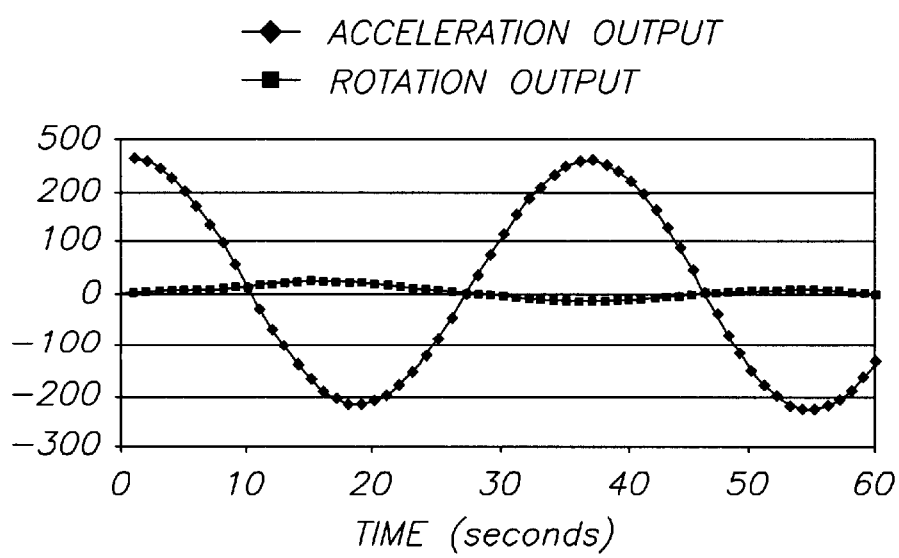
FIG. 9 is a graph of acceleration test results showing the response of rotation output and acceleration output as the sensor is rotated in Earth's gravity.

FIGS. 8 and 9 show outputs of the four electrode dual mode embodiment of the inertial sensor 10. FIG. 8 is a graph of inertial sensor 10 output, measured in millivolts, as a function of the inertial sensor 10 rotation rate, measured in degrees/second, about the z-axis. The graph of FIG. 8 was produced by positioning the inertial sensor 10 with the post 34 extending vertically and rotating the inertial sensor 10 about the post 34 along the z-axis at varying rotation rates $\Omega_z$ as illustrated in FIG. 1. The inertial sensor 10 output can be seen to be a linear function of the inertial sensor 10 rotation rate. Due to the imperfect spring softening compensation of the mass imbalance, there is some acceleration output even though there is no acceleration. FIG. 9 is a graph of inertial sensor 10 output, measured in millivolts, as a function of time as the inertial sensor 10 is rotated in Earth's gravity. At time=0 seconds the post 34 is approximately vertical and pointing upwards and thus the z-directed component of acceleration is at a maximum. At time=10 seconds the post is approximately horizontal and thus the z-directed component of acceleration zero. At time=19 seconds the post is approximately vertical and pointing downwards and thus the z-directed component is at a minimum. There is some rotation output even though there is no rotation of the inertial sensor 10.

Figure 10:
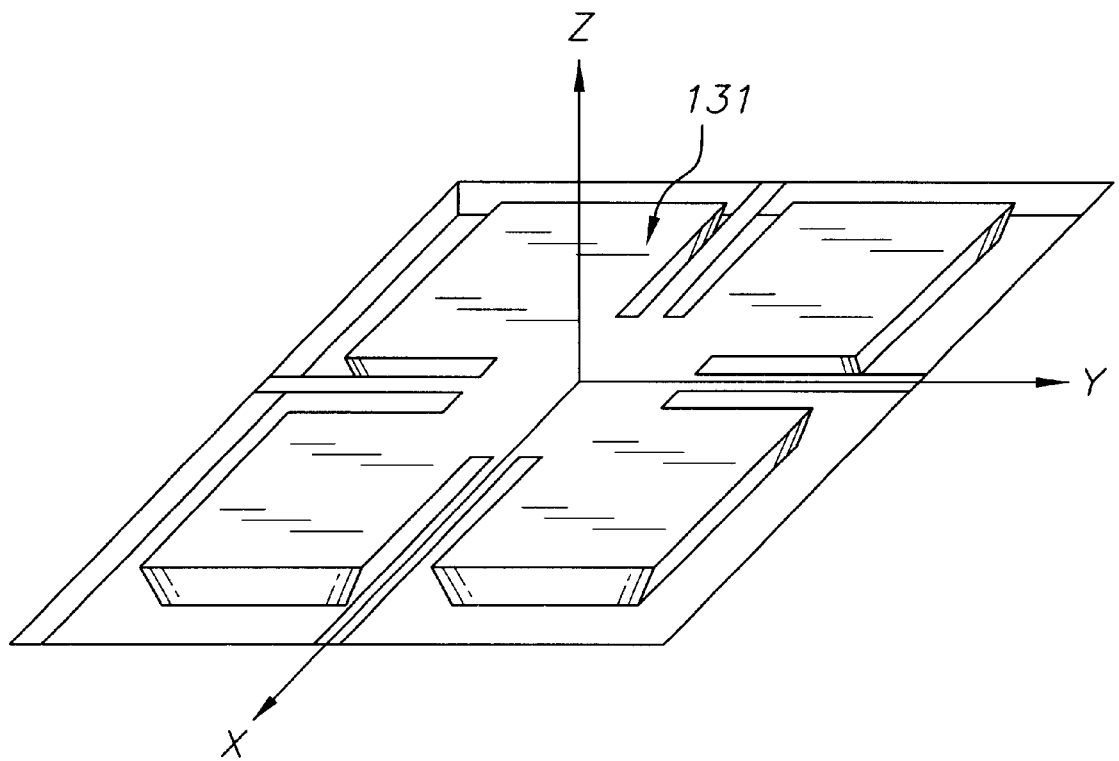
FIG. 10 is a perspective view illustrating an embodiment of a proof mass without a post passing though the center.

FIG. 10 illustrates an embodiment of a proof mass 13 without a post passing though the center. As explained in U.S. Pat. No. 5,894,090 to Tang, cited above, a post serves an important function in rotation measurements. However, when only measuring acceleration, the proof mass 131 of FIG. 10, without a post, can be used.

Figure 11:
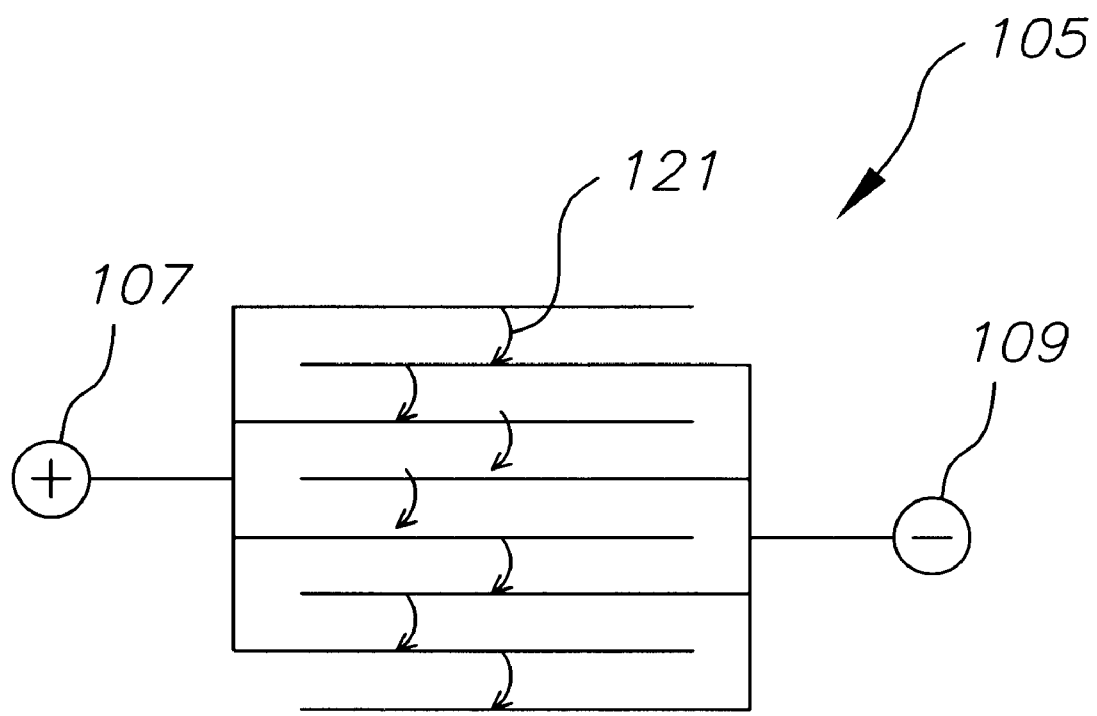
FIG. 11 is a diagrammatic view showing one embodiment of a sense electrode which uses alternating conductors biased by voltages to produce a fringing electric field.

FIG. 11 illustrates one embodiment of a sense electrode 105 which uses alternating conductors biased by voltages 107, 109 to produce fringing electric field 121. As a proof mass resonates near the sense electrode 105, it disturbs the electric field resulting in an output to sensing circuitry connected to the sense electrode 105. This embodiment can be used for detecting the motion of a proof mass of any material capable of disturbing the electric field 121.

There are many other possible circuits for measuring the change in mode shape in order to provide an output indicative of acceleration. For example, the bias V1, V2 can be increased or decreased in response to feedback indicating that acceleration has caused rotation of the mode shape. The acceleration, according EQUATIONS [24] and [25] is directly proportional to the change in electrostatic spring softening bias voltage required to compensate for the node shape rotation.

The z-axis directed component of acceleration can alternatively be determined using an open-loop embodiment of the electrical circuit 46. In this embodiment, sensing electrodes 48, 50, 52 are used to detect the amount of rotation of the resonant modes away from the spring axes x, y due to the z-directed component of acceleration. The acceleration is determined from the rotational displacement of the resonant modes or mode shape. The rotational displacement of the resonant modes or mode shape can be determined by using, for example, the Modal ID of the structure.

While the above description contains many specific features of the invention, these should not be construed as limitations on the scope of the invention, but rather as an example of one preferred embodiment thereof. Many other variations are possible. Accordingly, the scope of the inven-

What is claimed is:

1. An inertial sensor comprising:

a proof mass suspended by spring structures;

a plurality of electrodes for detecting resonant motion of the proof mass;

drive circuitry coupled to the electrodes for exciting a resonant motion of the proof mass and spring structures;

bias circuitry for supplying a voltage to modify the resonant motion of the proof mass and spring structures;

sensing circuitry for measuring acceleration by detecting a sinusoidal output representative of a change of said resonant motion;

output circuitry for outputting a signal indicating the acceleration;

wherein the proof mass has a defined center and a mass imbalance such that the center of mass of the structure is spaced from the defined center, the proof mass suspended from a frame by the spring structures;

the drive circuitry rocks the proof mass about a first rocking axis passing through the defined center; and the bias circuitry supplies the voltage to modify the resonant motion of the proof mass and spring structures to compensate for the mass imbalance.

2. The inertial sensor of claim 1, wherein:

the resonant motion of the proof mass and spring structures includes the first rocking axis and a second rocking axis substantially orthogonal to the first rocking axis; and the bias circuitry exerts a force on a portion of the proof mass to rotate the first and second rocking axes of the resonant motion of the proof mass and spring structures into alignment with substantially orthogonal first and second spring axes passing through the spring structures.

3. The inertial sensor of claim 2, further comprising:

a first signal generated by the rocking motion of the proof mass about the first spring axis;

a second signal generated by the rocking motion of the proof mass about the second spring axis, wherein the sensing circuitry detects the second signal as an indication of the change of the resonant motion of the proof mass and the spring structures;

a feedback circuit for providing the first signal to the drive circuitry to rock the proof mass about the first spring axis; and a feedback circuit for providing the second signal to the drive circuitry to dampen the rocking motion of the proof mass about the second sprig axis.

4. The inertial sensor of claim 2, wherein:

the sensing circuitry measures the acceleration by determining the rotation of the first and second rocking axes away from the first and second spring axes.

5. The inertial sensor of claim 3, wherein the output circuitry further comprises:

a first demodulator for demodulating the first and second signals to output a signal indicating the acceleration.

6. The inertial sensor of claim 3, wherein the output circuitry further comprises:

a mass rigidly attached to the defined center;

a first demodulator for demodulating the first and second signals in quadrature to generate a signal indicating rotation of the proof mass; and a second demodulator for demodulating the first and second signals in phase to generate a signal indicating the acceleration.

7. The inertial sensor of claim 1, further comprising:

a base structure having eight electrodes patterned on its surface, the base structure being positioned adjacent the proof mass; and wherein the drive circuitry, bias circuitry and sensing circuitry are electrically connected to the electrodes.

8. The inertial sensor of claim 1, further comprising:

a base structure having four electrodes patterned on its surface, the base structure being positioned adjacent the proof mass; and wherein the drive circuitry, bias circuitry and sensing circuitry are electrically connected to the electrodes.

9. The inertial sensor of claim 1, further comprising a base structure having electrodes patterned on its surface, the base structure positioned adjacent the proof mass;

wherein the drive circuitry, bias circuitry and sensing circuitry are electrically connected to the electrodes;

and wherein the electrodes electrically connected to the sensing circuitry produce a fringing electric field for detecting movement of the proof mass.

10. The inertial sensor of claim 1, wherein:

the proof mass is a micromachined symmetric leaf structure substantially defined in a plane.

11. The inertial sensor of claim 10, further comprising:

a post rigidly attached through the defined center and substantially perpendicular to the plane of the symmetric leaf structure.

12. A method for measuring acceleration comprising the steps of:

exciting a resonant motion of a proof mass and spring structures by rocking the proof mass about a first rocking axis passing through a defined center;

supplying a voltage to modify the resonant motion to compensate for a mass imbalance of the proof mass;

measuring acceleration by detecting a sinusoidal output representative of a change of the resonant motion; and outputting a signal indicating the acceleration.

13. The method for measuring acceleration of claim 12, further comprising the step of:

supplying a bias voltage to compensate for a mass imbalance of the proof mass so that the bias voltage exerts a force on a portion of the proof mass to rotate first and second substantially orthogonal rocking axes into alignment with substantially orthogonal first and second spring axes passing through the spring structures.

14. The method for measuring acceleration of claim 13, further comprising the steps of:

generating a first signal from the rocking motion of the proof mass about the first spring axis;

generating a second signal from the rocking motion of the proof mass about the second spring axis, wherein the second signal indicates the change of the resonant motion;

providing the first signal to rock the proof mass about the first spring axis; and providing the second signal to dampen the rocking motion of the proof mass about the second spring axis.

15. The method for measuring acceleration of claim 14, further comprising the step of:

measuring the acceleration by determining the rotation of the first and second rocking axes away from the first and second spring axes.

16. The method for measuring acceleration of claim 15, further comprising the step of:

demodulating the first and second signals to output a signal indicating the acceleration.

17. The method for measuring acceleration of claim 14, further comprising the steps of:

rigidly attaching a mass to the defined center;

demodulating the first and second signals in quadrature to generate a signal indicating rotation of the proof mass; and demodulating the first and second signals in phase to generate a signal indicating the acceleration.

18. The method for measuring acceleration of claim 12, further comprising the step of:

capacitively interacting with the proof mass with a base structure having eight electrodes patterned on its surface and positioned adjacent the proof mass.

19. The method for measuring acceleration of claim 12, further comprising the step of:

capacitively interacting with the proof mass with a base structure having four electrodes patterned on its surface and positioned adjacent the proof mass.

20. The method for measuring acceleration of claim 12, further comprising the steps of:

capacitively interacting with the proof mass with a base structure having electrodes patterned on its surface and positioned adjacent the proof mass; and detecting movement of the proof mass utilizing a fringing electric field produced by at least two of the electrodes.

21. The method for measuring acceleration of claim 12, wherein:

the proof mass is a micromachined symmetric leaf structure substantially defined in a plane.

22. The method for measuring acceleration of claim 21, further comprising the step of:

inserting a node at the defined center by rigidly attaching a post through the defined center and substantially perpendicular to the plane of the symmetric leaf structure.

* * * * *